US006979814B2

(12) United States Patent
Kudo et al.

(10) Patent No.: US 6,979,814 B2
(45) Date of Patent: Dec. 27, 2005

(54) MULTI-OPTICAL-PATH PHOTOELECTRIC SAFETY APPARATUS

(75) Inventors: Motohiro Kudo, Osaka (JP); Tetsu Inoue, Osaka (JP)

(73) Assignee: Keyence Corporation, Osaka (JP)

( * ) Notice: Subject to any disclaimer, the term of this patent is extended or adjusted under 35 U.S.C. 154(b) by 154 days.

(21) Appl. No.: 10/323,766

(22) Filed: Dec. 20, 2002

(65) Prior Publication Data

US 2003/0146373 A1 Aug. 7, 2003

(30) Foreign Application Priority Data

Jan. 25, 2002 (JP) ........................ P. 2002-017572

(51) Int. Cl.[7] ................................................ H01J 40/14
(52) U.S. Cl. ...................................... 250/221; 340/556
(58) Field of Search ........................ 250/221; 340/552, 340/555–557

(56) References Cited

U.S. PATENT DOCUMENTS 3,704,396 A 11/1972 MacDonald
4,249,074 A 2/1981 Zettler et al.
5,233,185 A * 8/1993 Whitaker ................. 250/222.1
5,243,183 A * 9/1993 Barron et al. ............ 250/222.1
6,218,940 B1 * 4/2001 Rejc et al. .................. 340/556
6,624,751 B2 * 9/2003 Haberer et al. ............. 340/555
6,737,970 B2 * 5/2004 Wuestefeld et al. ........ 340/552

FOREIGN PATENT DOCUMENTS

DE 23 43 096 A 3/1975
DE 44 22 497 A 1/1996

* cited by examiner

*Primary Examiner*—David Porta
*Assistant Examiner*—Stephen Yam
(74) *Attorney, Agent, or Firm*—Smith Patent Office

(57) ABSTRACT

A multi-optical-path photoelectric safety apparatus is provided that has a light emitting unit, a light receiving unit and a control unit for controlling each optical path. A light block substance sensing function for a multi-optical-path light curtain is also provided to sense an object between the light emitting unit and the light receiving unit. A muting area setting unit is also provided that can be taught how to set an area for exerting a muting function. The muting function can be provided only in a partial area of the light curtain by using the muting area setting unit.

13 Claims, 15 Drawing Sheets

MULTI-OPTICAL-PATH PHOTOELECTRIC SAFETY APPARATUS

BACKGROUND OF THE INVENTION

1. Field of the Invention

The present invention relates to a multi-optical-path photoelectric safety apparatus having a light emitting unit and a light receiving unit. More particularly, the present invention relates to a multi-optical-path photoelectric safety apparatus comprising a muting function.

2. Discussion of the Related Art

A multi-optical-path photoelectric safety apparatus is provided to ensure worker safety when using an apparatus involving a source of danger, such as a pressing machine. The multi-optical-path photoelectric safety apparatus comprises a light emitting unit and a light receiving unit. The light emitting unit comprises a large number of light emitting elements arranged in a row. The light receiving unit comprises a corresponding number of light receiving elements as the number of the light emitting elements, and they are also arranged in a row. The light emitting and receiving units form a protective barrier by making a light curtain. When a light blocking substance through which light cannot transmit enters a detection area of the protective barrier, the operation of the machine is forcibly stopped.

In a pressing or other machine it is necessary to carry a workpiece in and carry the post-worked workpiece out. Thus, the workpiece needs to be passed through the light curtain. The multi-optical-path photoelectric safety apparatus comprises a muting function to allow the workpiece to pass through the light curtain. That is, the muting function temporarily makes the protection function of the multi-optical-path photoelectric safety apparatus ineffective when the workpiece passes through the light curtain.

FIG. 15 shows an outline of a multi-optical-path photoelectric safety apparatus comprising a muting function in a related art device. In the related art example, a light emitting unit 2 and a light receiving unit 3 are installed on either side of a conveyor line 1 carrying a workpiece into a pressing machine.

The conveyor line 1 is provided with workpiece detection sensors 4 for detecting a workpiece W passing through a light curtain. When the workpiece W is detected, the muting function is started. During the muting function in the related art device, all of the detection areas of the light curtain formed between the light emitting unit 2 and the light receiving unit 3 become ineffective.

The muting function removes the essential protection function from the multi-optical-path photoelectric safety apparatus although this protection function is only removed temporarily. However, removing the protection function of all of the detection areas of the light curtain when the muting function is operated is not preferred.

SUMMARY OF THE INVENTION

It is therefore an object of the invention to provide a multi-optical-path photoelectric safety apparatus for making a muting function effective while exerting the essential protection function of the multi-optical-path photoelectric safety apparatus. Namely, a light block substance sensing function provides compatibility between the functions, thereby making it possible to allow a light block substance, such as a workpiece, to pass through a light curtain while continuing to ensure safety.

To this end, according to the invention, there is provided a multi-optical-path photoelectric safety apparatus comprising: a light emitting unit; a light receiving unit forming a light curtain with the light receiving unit; and a muting function for temporarily rendering a protection function of the light curtain ineffective by allowing a predetermined light block substance to pass through the light curtain, and wherein the muting function includes defining a muting area where the muting function is performed and the muting areas is in a region of a detection area forming the light curtain.

Preferably, the muting area can be taught to be set to a size related to a predetermined light block substance.

According to the invention, the muting function serves substantially only the area through which a predetermined light block substance passes in the light curtain formed between the light emitting unit and the light receiving unit. In the other areas, the essential protection function of the multi-optical-path photoelectric safety apparatus is on continuously. Therefore, compatibility between the essential protection function of the multi-optical-path photoelectric safety apparatus and the muting function can be provided. This allows a light block substance such as a workpiece to pass through the light curtain while safety is maintained.

These and other objects and advantages of the invention will become more apparent from the detailed description of the preferred embodiments described below.

DETAILED DESCRIPTION OF THE PREFERRED EMBODIMENTS

Figure 1:
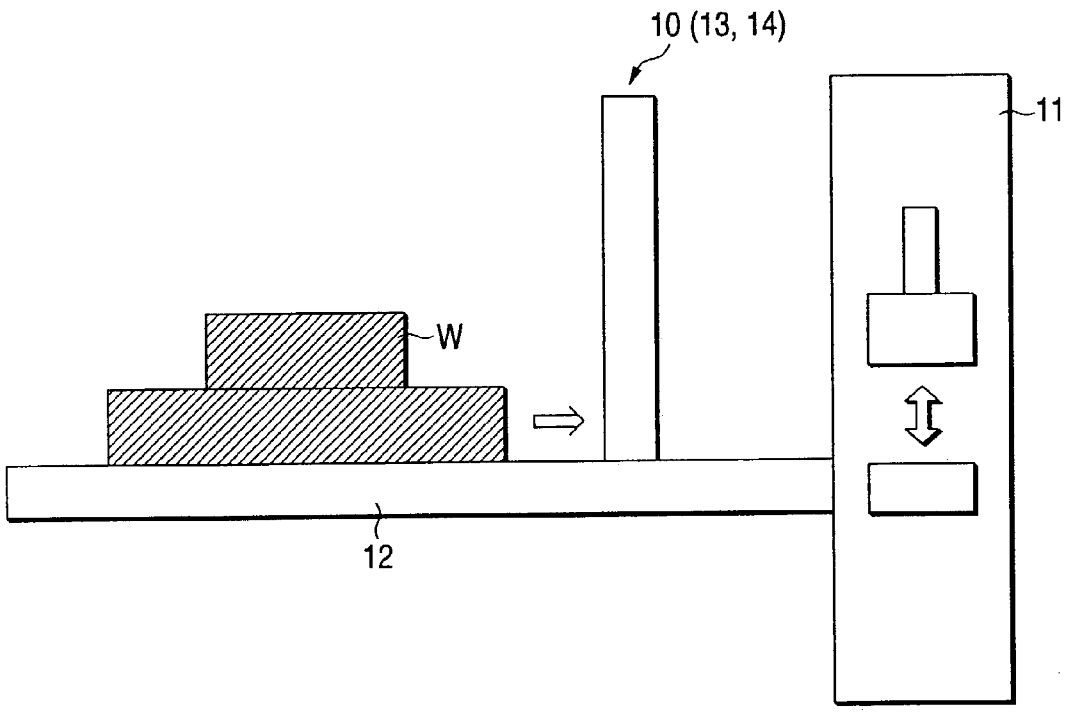
FIG. 1 is a drawing to describe an outline of a multi-optical-path photoelectric safety apparatus installed in a conveyor line according to an embodiment of the present invention.
Figure 2:
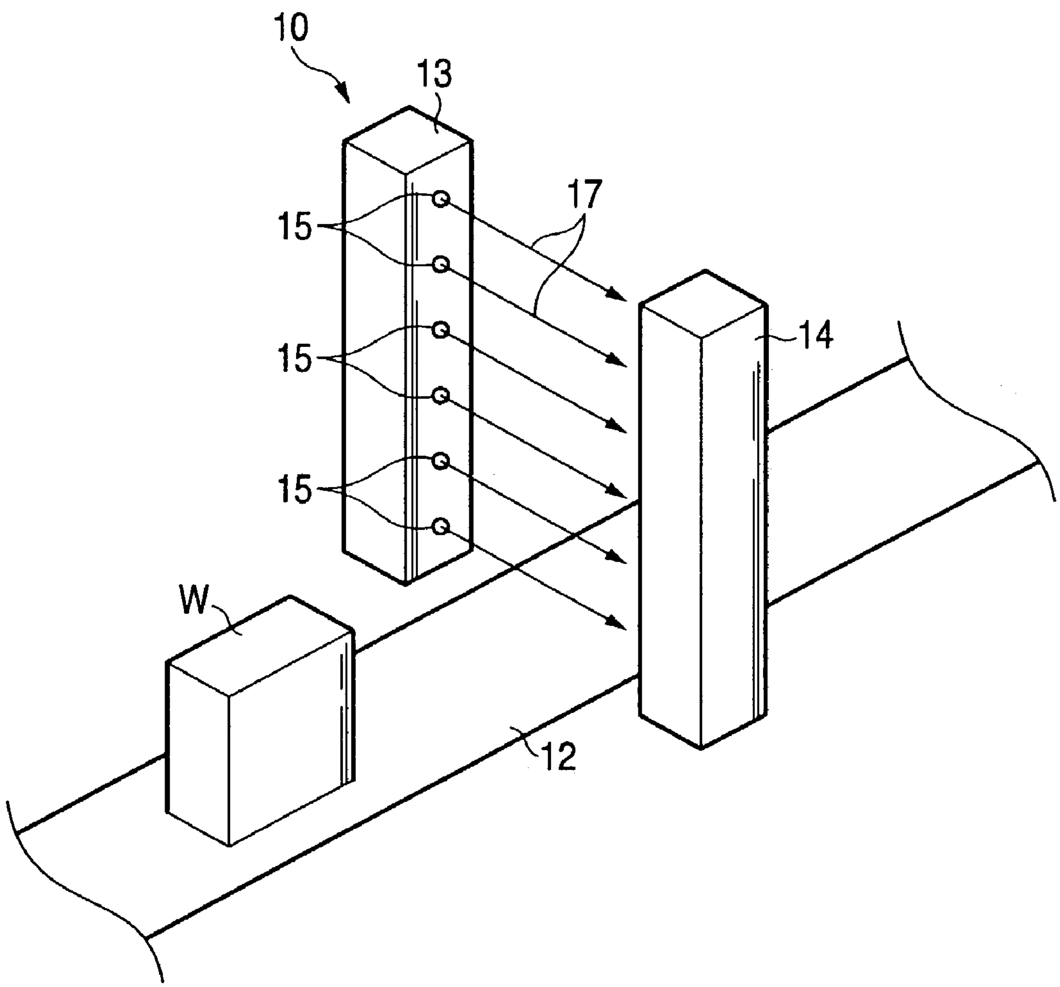
FIG. 2 is a drawing describing a placement example of a light emitting unit and a light receiving unit included in the multi-optical-path photoelectric safety apparatus according to an embodiment of the present invention.

A multi-optical-path photoelectric safety apparatus 10 according to a first embodiment includes a light emitting unit 13 and a light receiving unit 14 placed on either side of a conveyor line 12 that extends to a pressing machine 11 as shown in FIGS. 1 and 2.

Figure 3:
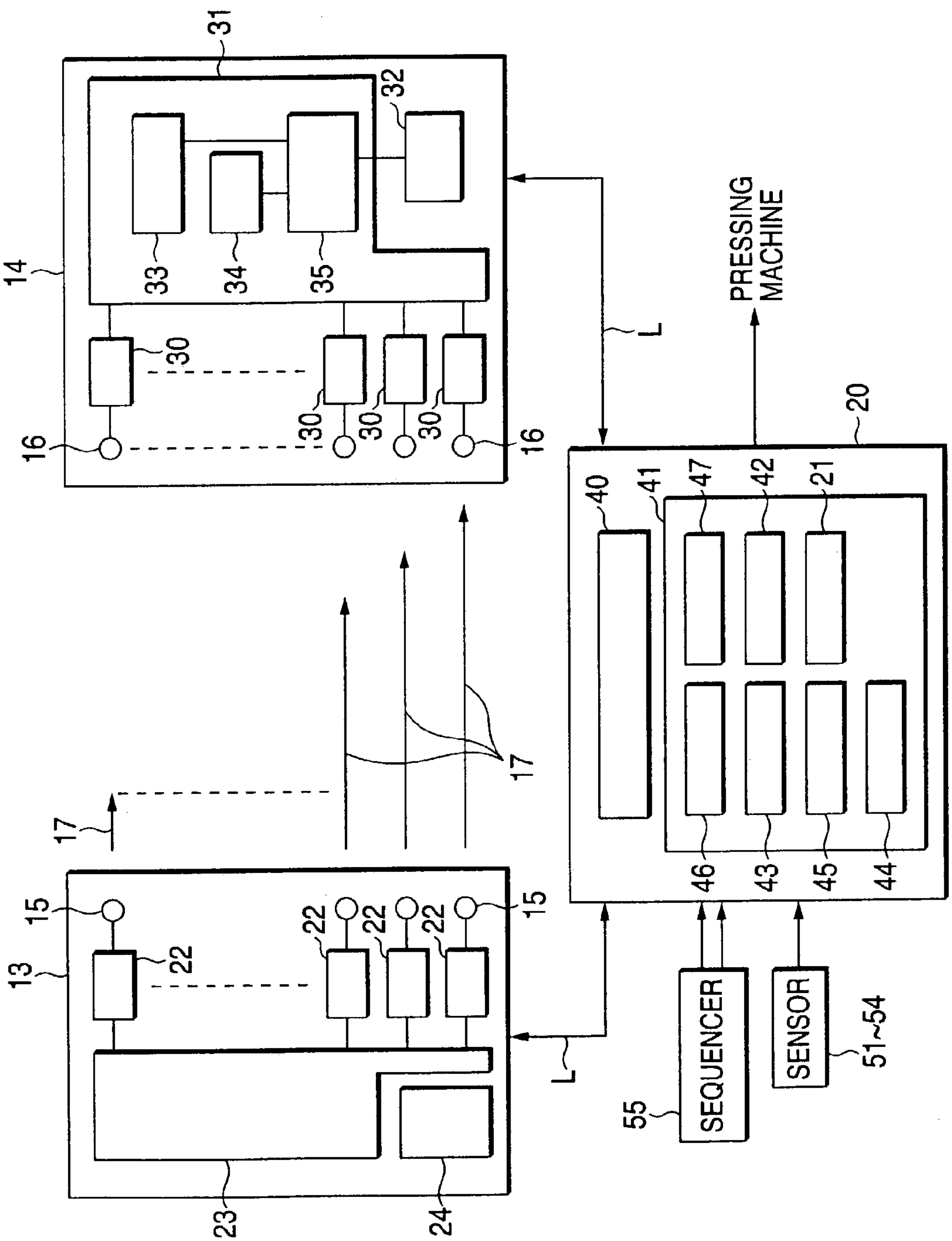
FIG. 3 is a block diagram showing a general configuration of the multi-optical-path photoelectric safety apparatus according to an embodiment of the present invention.

As seen in FIG. 2, the light emitting unit 13 has an elongated case extending in a longitudinal direction and comprises N light emitting elements 15 (that are particularly shown in FIG. 3). The light emitting elements 15 are placed in the case at equal intervals in a row along the lengthwise direction of the case. The interval between the adjacent light emitting elements 15 is not specifically limited and can be, for example, 20 mm.

Likewise, the light receiving unit 14 has an elongated case extending in a longitudinal direction and comprises a corresponding number of light receiving elements 16 (FIG. 3) as the number of the light emitting elements 15. The light receiving elements 16 are placed in the case at equal intervals in a row along the lengthwise direction of the case. The interval between the adjacent light receiving elements 16 is the same as the interval that is used between the adjacent light emitting elements 15.

The light emitting unit 13 and the light receiving unit 14 are placed facing each other with the conveyor line 12 being disposed there between. A horizontal light beam is emitted from each light emitting element 15 of the light emitting unit 13 to the light receiving element 16 of the light receiving unit 14 that corresponds to the light emitting element 15. This forms a light curtain crossing the conveyor line 12 and provides a protective barrier, as shown in FIG. 2. Reference numeral 17 in FIG. 2 denotes an optical path or a light beam and substantially represents a part of the light curtain.

The multi-optical-path photoelectric safety apparatus 10 has a controller 20 as shown in FIG. 3. The controller 20 preferably includes a state display monitor or user interface display section 21.

Figure 4:
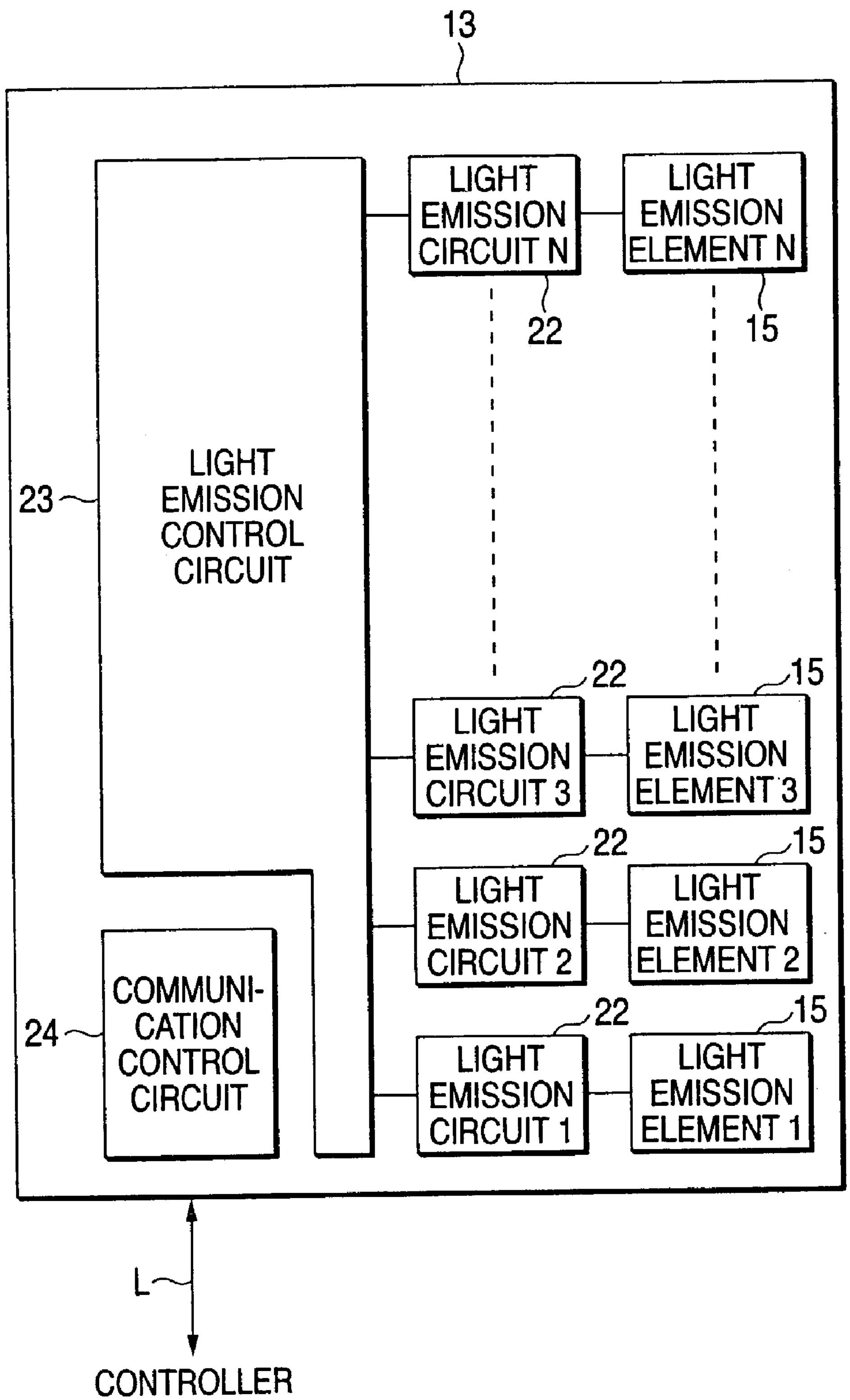
FIG. 4 is an enlarged block diagram of the light emitting unit in the multi-optical-path photoelectric safety apparatus according to an embodiment of the present invention.
Figure 5:
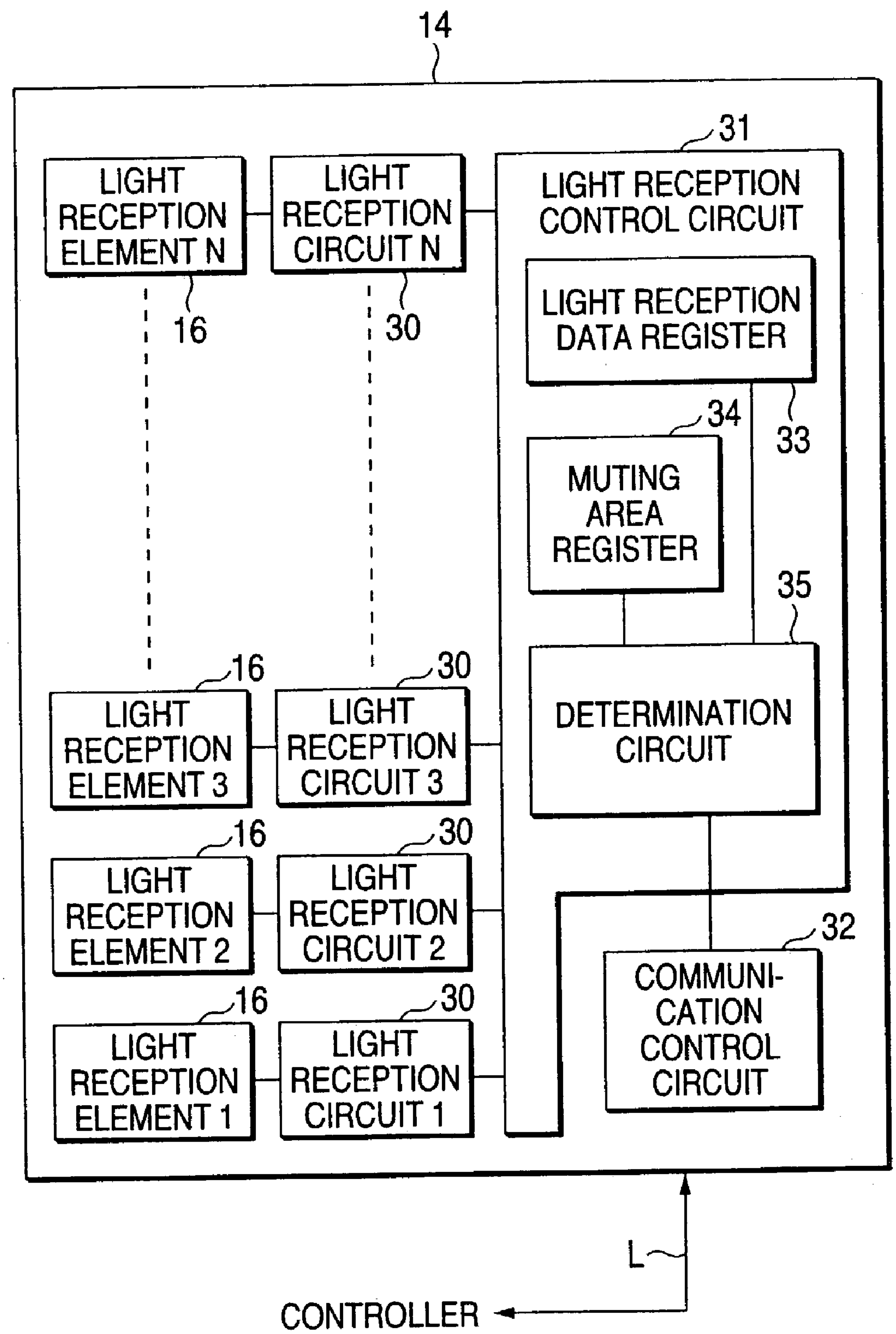
FIG. 5 is an enlarged block diagram of the light receiving unit included in the multi-optical-path photoelectric safety apparatus according to an embodiment of the present invention.
Figure 6:
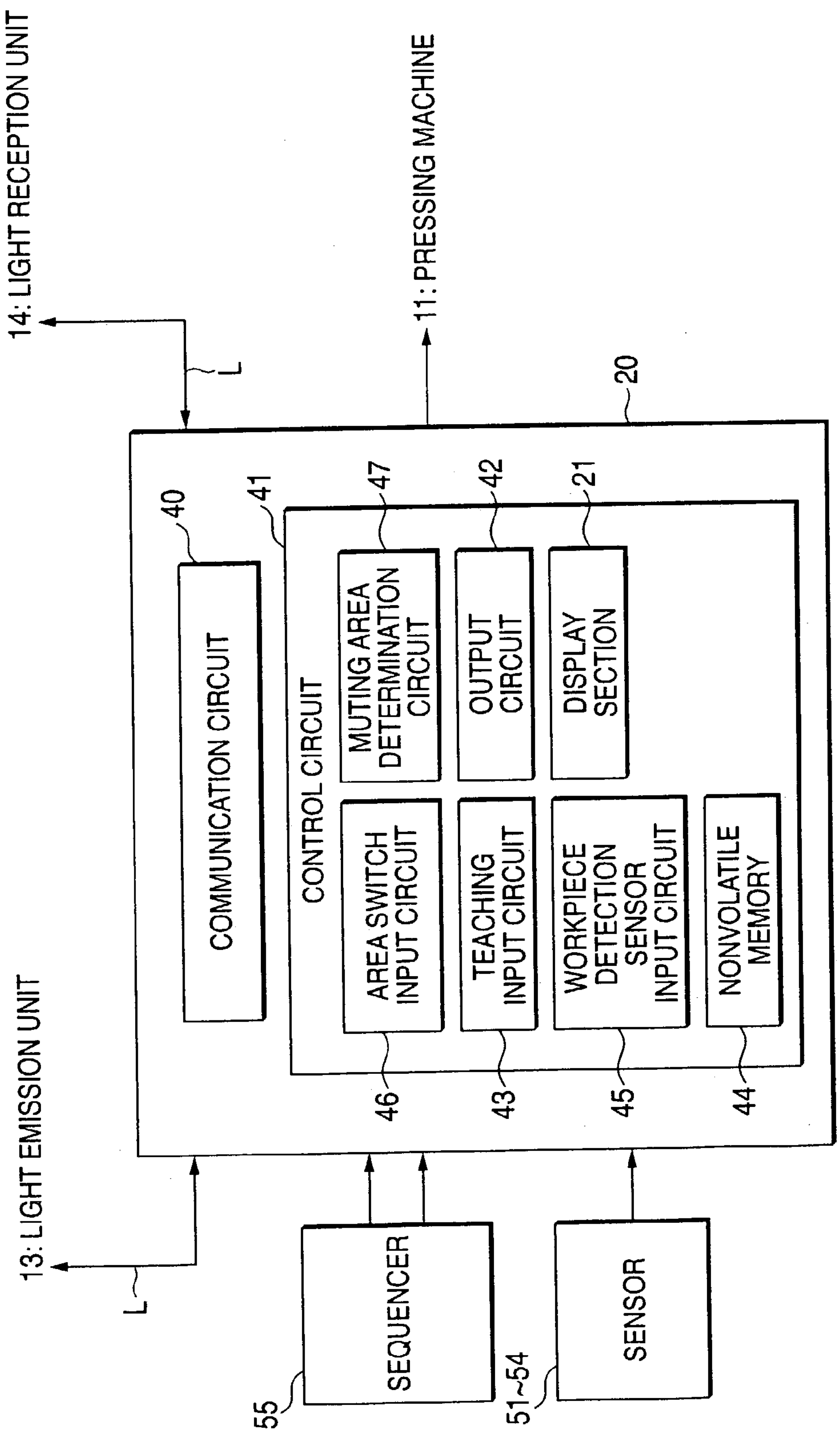
FIG. 6 is an enlarged block diagram of a controller included in the multi-optical-path photoelectric safety apparatus according to an embodiment of the present invention.

FIGS. 3 to 6 are block diagrams relevant to the multi-optical-path photoelectric safety apparatus 10. FIG. 3 is a block diagram to show the general configuration of the multi-optical-path photoelectric safety apparatus 10. FIG. 4 is a block diagram of the light emitting unit 13. FIG. 5 is a block diagram of the light receiving unit 14. Further, FIG. 6 is a block diagram of the controller 20.

Referring particularly to FIG. 4, the light emitting element 13 comprises the N light emitting elements 15, N light emitting circuits 22, a light emitting control circuit 23, and a communication control circuit 24. The light emitting circuits 22 are provided in a one-to-one correspondence with the light emitting elements 15 which can be, for example, light emitting diodes for driving them. The light emitting control circuit 23 controls the light emitting circuits 22. The communication control circuit 24 controls communications with the controller 20. Upon receiving an instruction from the controller 20, the light emitting control circuit 23 starts the N light emitting circuits 22 in order. This sequentially turns on the light emitting element 15 of the first optical path to the light emitting element 15 of the Nth optical path. Accordingly, the light emitting element 13 emits a light beam in order from the first optical path through the Nth optical path to the light receiving unit 14 at predetermined light emitting timings.

Referring to FIG. 5, the light receiving element 14 comprises the N light receiving elements 16, N light receiving circuits 30, a light receiving control circuit 31, and a communication control circuit 32. The light receiving circuits 30 are provided in a one-to-one correspondence with the light receiving elements 16. The light receiving control circuit 31 controls the light receiving circuits 30. The communication control circuit 32 controls communications with the controller 20. Upon receiving a control signal from the controller 20, the light receiving control circuit 31 makes the light receiving circuit 30 of the first optical path to the light receiving circuit 30 of the Nth optical path operate in synchronization with the operation of the corresponding light emitting circuits 22. This allows the light beams emitted one after another from the light emitting unit 13 to be received at the corresponding light receiving elements 16.

The light receiving control circuit 31 also preferably includes a light receiving data register 33, two muting area registers 34, and a determination circuit 35. The light receiving data register 33 temporarily stores the light receiving data. The muting area register 34 stores information concerning a muting area as will be described later. The determination circuit 35 determines whether any one of optical paths in a detection area other than the muting area is in a light block state based on light incidence/light block information in the detection area outside the muting area (when the muting operation is performed). The determination circuit 35 determines whether any one of the optical paths is in a light blocked state based on the light incidence/light block information in all of the areas of the light curtain when no muting operation is performed.

Referring to FIG. 6, the controller 20 comprises a communication circuit 40 for conducting communications between the light emitting unit 13, the light receiving unit 14 and a control circuit 41.

Figure 7:
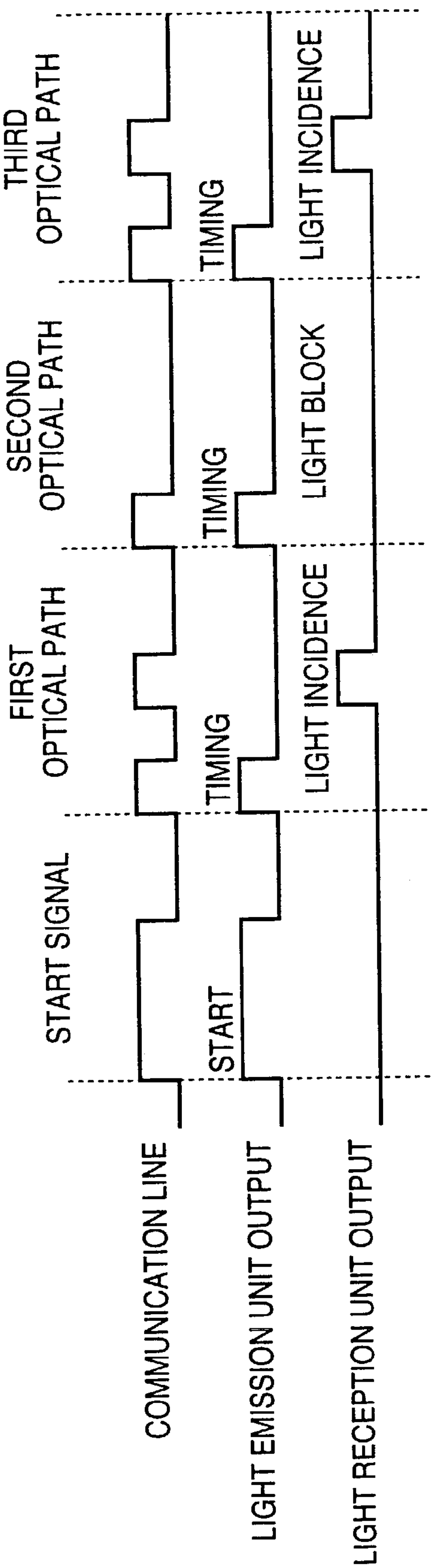
FIG. 7 is a chart describing the contents of the signals passing through a communication line or a signal line for connecting the light emitting unit, the light receiving unit, and the controller in the multi-optical-path photoelectric safety apparatus according to an embodiment of the present invention.

The light emitting unit 13, the light receiving unit 14, and the controller 20 are connected by the communication line or the signal line L. This line L allows not only communications, but also transfer of the light incidence/light block information (FIG. 7) between the controller 20, the light emitting unit 13 and the light receiving unit 14. As seen in FIG. 7, a signal on the communication line or the signal line L is provided by combining the timing signal output from the light emitting unit 13 and the light incidence/light block information signal output from the light receiving unit 14.

The control circuit 41 of the controller 20 preferably comprises the state display monitor or user interface display section 21. The control circuit 41 also comprises an output circuit 42 for turning on/off an output signal for an operation stop signal, etc., to the pressing machine 11 based on information from the determination circuit 35 of the light receiving unit 14.

The controller 20 comprises a teaching input circuit 43 for the user to set a muting area by teaching. The teaching input circuit 43 has a teaching button (not shown) forming a part of input means that can be operated manually by the user. By operating this button, the user can switch the mode between a teaching mode where the user sets a muting area by a teaching method and a normal operation mode (RUN mode) where the multi-optical-path photoelectric safety apparatus 10 operates its essential functions.

The control circuit 41 of the controller 20 further comprises at least one nonvolatile memory 44. When the mode is switched from the teaching mode to the normal operation mode by the user operating the teaching button, the muting area set in the teaching mode is stored in the nonvolatile memory 44.

Figure 8:
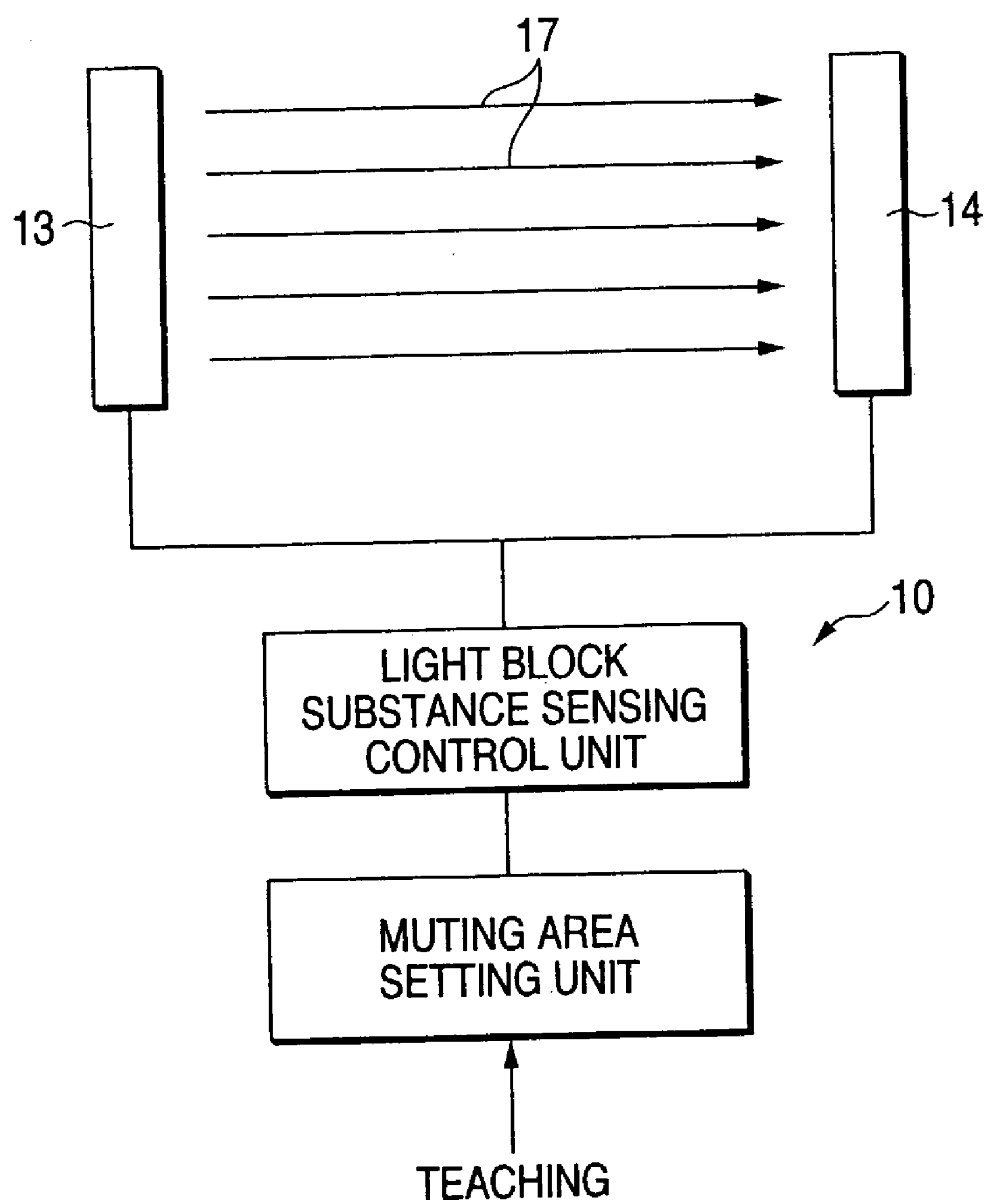
FIG. 8 is a block diagram conceptually showing a means for setting a muting area by teaching with a limited partial area in a light curtain.

Means related to setting the muting area by the teaching method described above is shown in FIG. 8. That is, the multi-optical-path photoelectric safety apparatus 10 has the light emitting unit 13, the light receiving unit 14, a control unit, and a muting area setting unit. The light emitting unit 13 preferably comprises a large number of light emitting elements equally spaced from each other and that are placed in a row. The light receiving unit 14 is placed facing the light emitting unit 13. The light receiving unit comprises as many light receiving elements as the number of the light emitting elements. The light receiving elements are equally spaced from each other and they are also placed in a row. For each optical path 17, the control unit controls a light blocking substance sensing function for the multi-optical-path light curtain that senses the entry of a light blocking substance between the light emitting unit 13 and the light receiving unit 14. The muting area setting unit sets a muting area by a teaching mode. It also operates the muting function to temporarily make the light blocking substance sensing function ineffective as a predetermined light blocking substance (such as a workpiece) is allowed to pass through the light curtain. The muting area setting unit enables the user to set the muting area to operate in a limited area of the light curtain.

Figure 9:
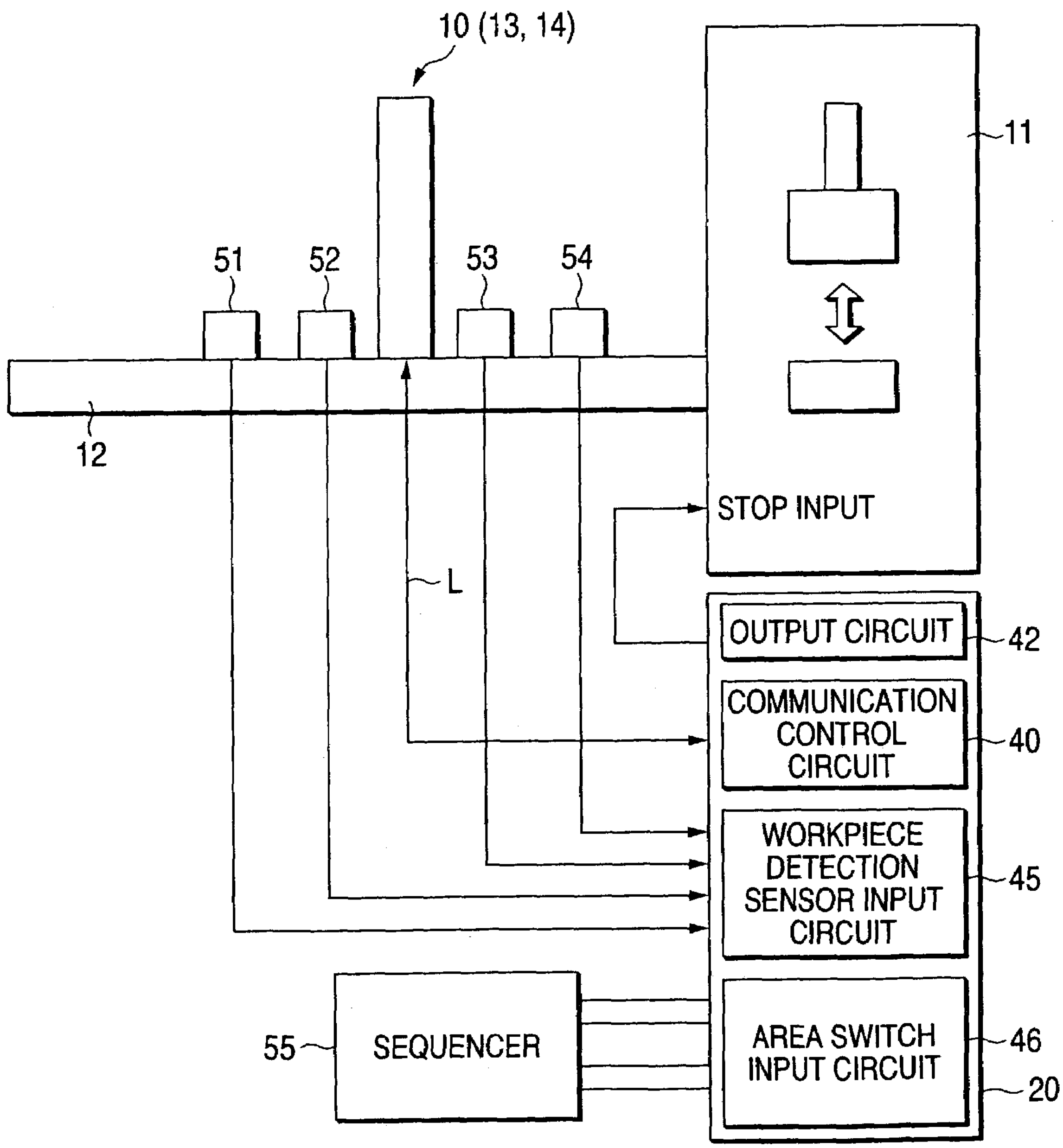
FIG. 9 is a diagram to show a general configuration of the multi-optical-path photoelectric safety apparatus according to an embodiment of the present invention.

In FIG. 9, a plurality of workpiece detection sensors 51 to 54 are disposed on the conveyor line 12. The light emitting unit 13 and the light receiving unit 14 are between these sensors in the workpiece transport direction. The signals from the sensors 51 to 54 are input to a workpiece detection sensor input circuit 45 of the controller 20.

The conveyor line 12 and the pressing machine 11 are controlled integrally by a sequencer 55. If more than one muting area is set, a muting area switch signal is sent from the sequencer 55 to an area switch input circuit 46 of the controller 20 as shown in FIGS. 6 and 9.

Figure 10:
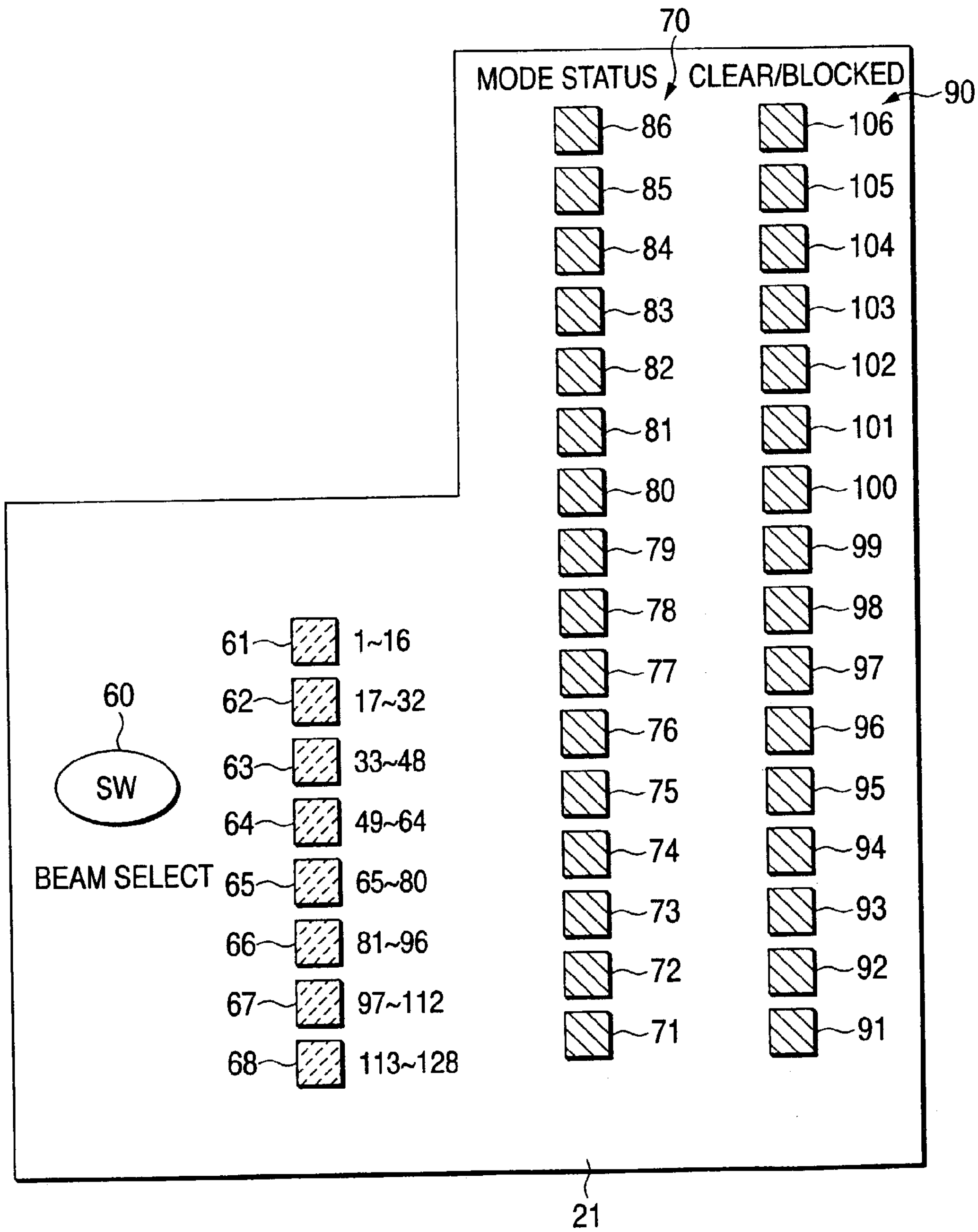
FIG. 10 is a drawing describing an outline for a display section installed in the controller.

FIG. 10 shows an example of the state display monitor or user interface display section 21. The display section 21 comprises an optical path area selection switch 60 and has a plurality of LED indicator lamps 61 to 68 that are slightly spaced apart and placed in a row in the longitudinal direction to the right of the selection switch 60.

The display section 21 also has a mode state indicator lamp group 70 made up of a plurality of LEDs. The mode state indicator lamp group 70 is not limited to a particular number of lamps. In the embodiment shown, the mode state indicator lamp group 70 is preferably made up of 16 LED indicator lamps 71 to 86 as the basic unit having 16 optical paths. These lamps are slightly spaced apart and are placed with in a row in the longitudinal direction.

The display section 21 also has a light incidence/light block state indicator lamp group 90 made up of a plurality of LEDs. The light incidence/light block state indicator lamp group 90 is not limited to a particular number of lamps. In the embodiment shown, the light incidence/light block state indicator lamp group 90 is preferably made up of 16 LED indicator lamps 91 to 106 as the basic unit having 16 optical paths. These lamps are also slightly spaced apart and are placed in a row in the longitudinal direction.

Since the light incidence/light block information is always supplied from the light receiving unit 14 to the controller 20 over the communication line or the signal line L during the operation of the controller 20, the display section 21 of the controller 20 is updated in real time.

The optical path area selection switch 60 assumes that the light emitting unit 13 and the light receiving unit 14 comprise a maximum of 128 optical paths. Also, the optical path area selection switch 60 provides a selection means for allowing the user to select the optical path area to be displayed on the display section 21 so as to display, in 16 optical-path units, information concerning all of the optical paths on the mode state indicator lamp group 70 and the light incidence/light block state indicator lamp group 90. When the light emitting unit 13 and the light receiving unit 14 comprise 64 optical paths and the user operates the optical path area selection switch 60 to selecting the first block (consisting of the first optical path to the sixteenth optical path), the mode state and the light incidence/light block state of each of these paths are displayed on the mode state indicator lamp group 70 and the light incidence/light block state indicator lamp group 90.

Next, if the user presses the optical path area selection switch 60 again and selects the second block (consisting of the seventeenth optical path to the thirty-second optical path), the mode state and the light incidence/light block state of each of these paths are displayed on the mode state indicator lamp group 70 and the light incidence/light block state indicator lamp group 90. If the user presses the optical path area selection switch 60 again and selects the third block (consisting of the thirty-third optical path to the forty-eighth optical path), the mode state and the light incidence/light block state of each of these paths are displayed on the mode state indicator lamp group 70 and the light incidence/light block state indicator lamp group 90.

If the user again presses the optical path area selection switch 60 and selects the fourth block (consisting of the forty-ninth optical path to the sixty-fourth optical path), the mode state and the light incidence/light block state of each of these paths are displayed on the mode state indicator lamp group 70 and the light incidence/light block state indicator lamp group 90.

It is preferred that the basic unit uses eight indicator lamps 61–68, each lamp being for 16 optical paths. The lamps are disposed to the right of the switch 60 and indicate the current optical path area selected from among the eight blocks to show the first optical path to the 128th optical path. The indicator lamps 61–68 are arranged in a row in the longitudinal direction and are assigned from top to bottom as follows: The indicator lamp 61 to the first to sixteenth optical paths; the indicator lamp 62 to the seventeenth to thirty-second optical paths; the indicator lamp 63 to the thirty-third to forty-eighth optical paths; the indicator lamp 64 to the forty-ninth to sixty-fourth optical paths; the indicator lamp 65 to the sixty-fifth to eightieth optical paths; the indicator lamp 66 to the eighty-first to ninety-sixth optical paths; the indicator lamp 67 to the ninety-seventh to 112th optical paths; and the indicator lamp 68 to the 113th to 128th optical paths. To display these assignments, an identification sign or numeral (1–16, 17–32, . . . , 113–128) is preferably added to the right or top or bottom of each of the indicator lamps 61–68.

The optical path area indicator lamps 61–68 may also be assigned to the optical paths as desired. For example, they may be assigned in an order from bottom to top starting with the first to sixteenth optical paths, the seventeenth to thirty-second optical paths, . . . , the 113th to 128th optical paths. When the indicator lamps contained in the indicator lamp groups 70 and 90 are placed side by side, the optical path area indicator lamps 61–68 may be assigned in an order from right to left starting with the first to sixteenth optical paths, the seventeenth to thirty-second optical paths, . . . , the 113th to 128th optical paths or they may be assigned in order from left to right starting with the first to sixteenth optical paths, the seventeenth to thirty-second optical paths, . . . , the 113th to 128th optical paths.

When the muting area is set, the indicator lamps of the mode state indicator lamp group 70 that correspond to the optical paths where muting is set, are turned on. Accordingly, the user can visually check whether or not the muting area is set for each optical path.

As shown in FIG. 6, the control circuit 41 of the controller 20 further includes a muting area determination circuit 47 for determining a muting area from the light incidence/light block information received from the light receiving unit 14 and the teaching operation information received from the teaching input circuit 43. This muting area determination circuit 47 may include a user interface for enabling the user to directly enter a muting area by, for example, a switch input and/or by a numeric keypad.

Figure 11:
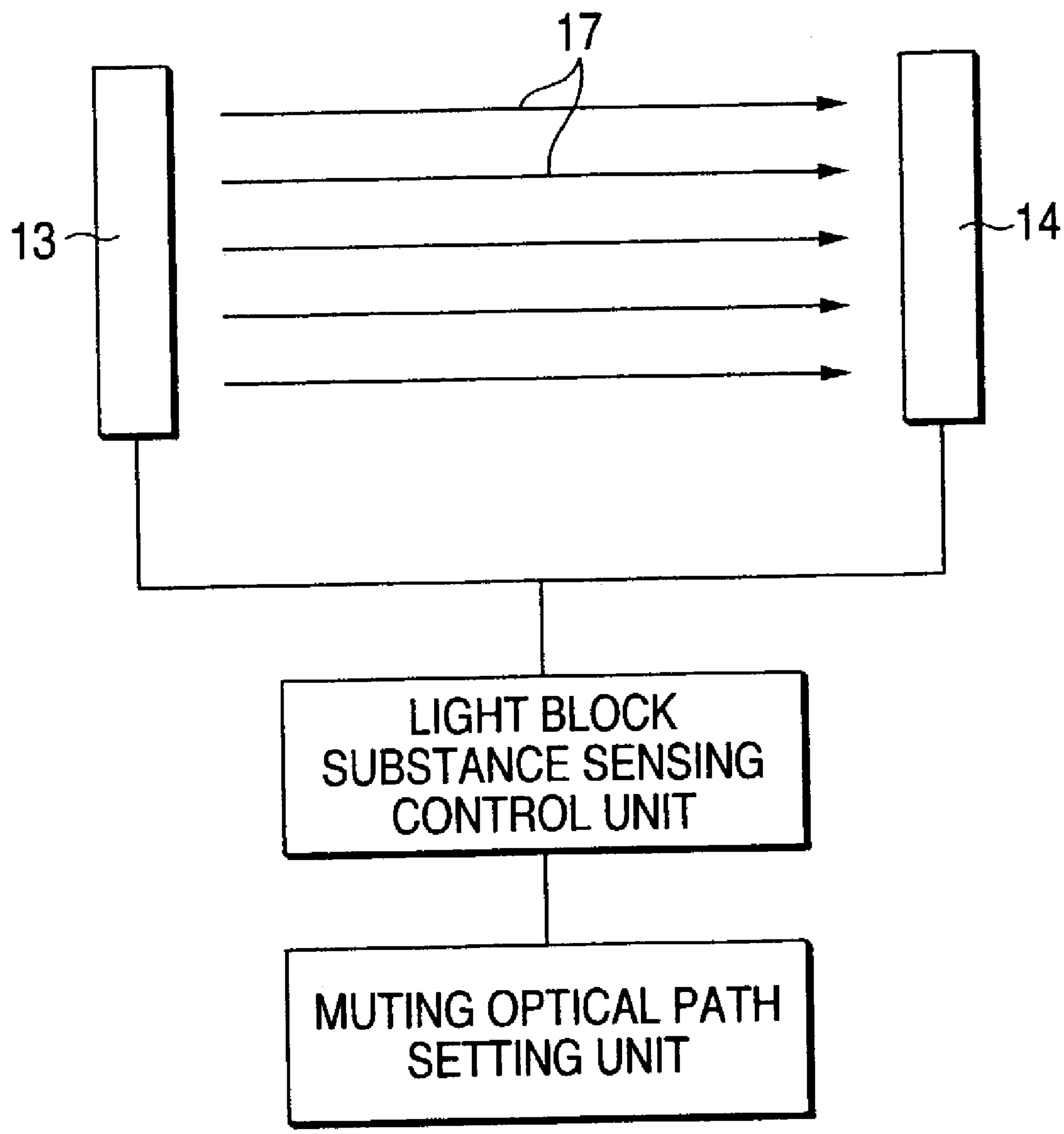
FIG. 11 is a block diagram conceptually showing a means for setting a muting area as a limited partial area in a light curtain by a user who manually enters the muting area from the outside.
Figure 12A:
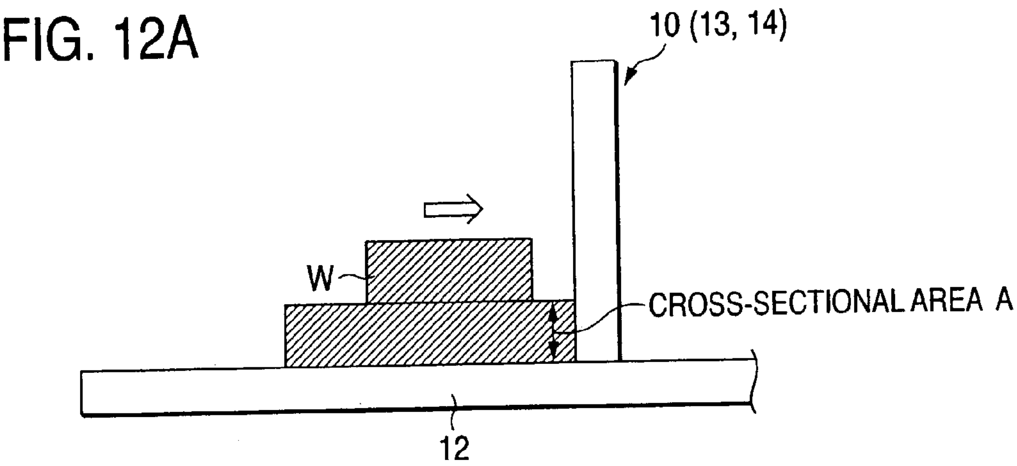
FIGS. 12A–12C are drawings describing the switching to a muting area having a size responsive to the cross-sectional area of a workpiece when the workpiece contains portions having different heights that pass through the light curtain.
Figure 12B:
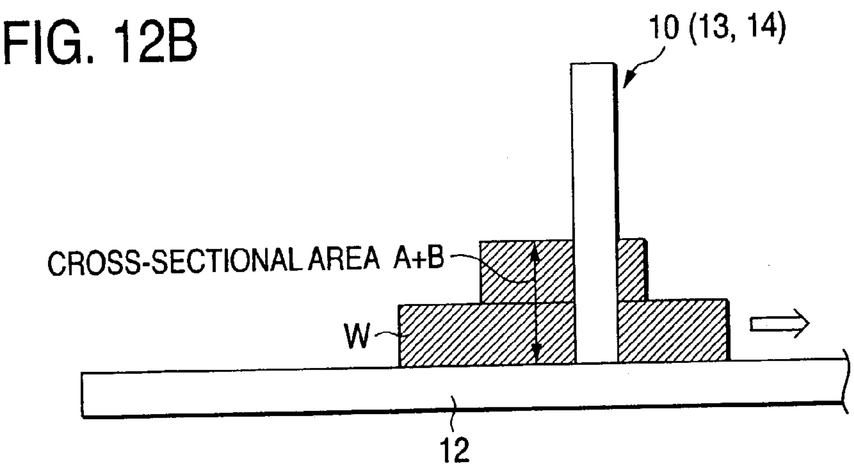
Figure 12C:
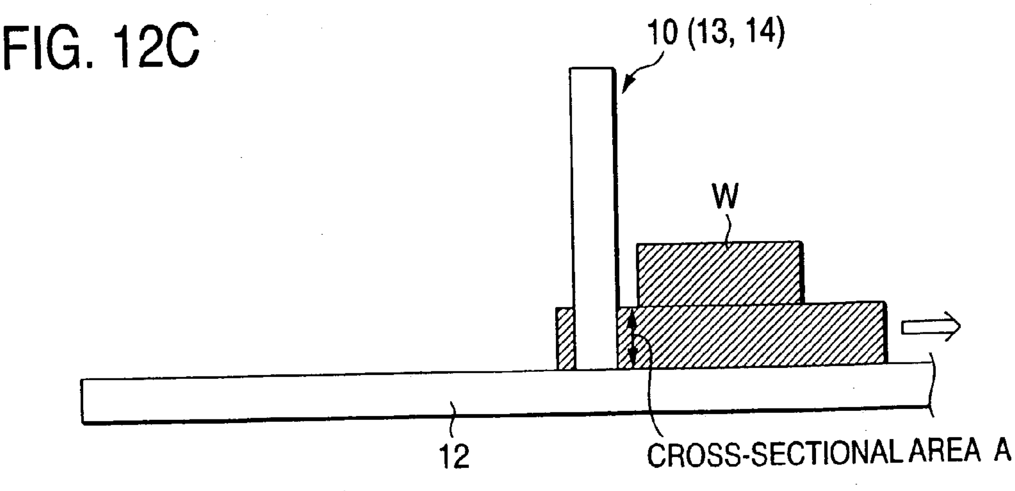

FIG. 11 generally shows a means for setting the muting area by an external input as described above. The multi-optical-path photoelectric safety apparatus 10 has the light emitting unit 13, the light receiving unit 14, the control unit and the muting optical path setting unit. The light emitting unit 13 comprises a large number of light emitting elements equally spaced from each other and placed in a row. The light receiving unit 14 faces the light emitting unit 13 and comprises as many light receiving elements as the number of the light emitting elements. The light receiving elements are also equally spaced from each other and are placed in a row. For each optical path 17, the control unit controls a light blocking substance sensing function for the multi-optical-path light curtain that senses the entry of a light blocking substance between the light emitting unit 13 and the light receiving unit 14. Also for each optical path 17, the muting optical path setting unit sets the muting function to temporarily make the light blocking substance sensing function of the light curtain ineffective as a predetermined light blocking substance (such as a workpiece) is allowed to pass through the light curtain. The muting optical path setting unit allows the user to set the muting area to operate in a limited area of the light curtain.

The teaching operation for storing a part of the detection area of the light curtain in the control circuit 41 as the muting area will now be discussed.

(Step 1) The user switches a switch (not shown) contained in the control circuit 41 of the controller 20 for making the muting function effective.

(Step 2) The user switches a switch (not shown) of the teaching input circuit 43 of the controller 20 for switching the mode from the normal operation mode (RUN mode) to the teaching mode for setting a first muting area.

(Step 3) The user operates the teaching button of the teaching input circuit 43, thereby placing the apparatus in the teaching state, and the user blocks light in the area where the muting function will operate in the light curtain formed between the light emitting unit 13 and the light receiving unit 14. Next, the user operates the teaching button again to confirm the teaching input. In other words, the optical paths blocked between the first teaching button operation and the second teaching button operation are stored as the muting area. The control circuit 31 of the light receiving unit 14 determines whether or not the light receiving circuit 30 for each optical path in the light receiving unit 14 receives the light beam from the corresponding optical path in the light emitting unit 13. The control circuit 31 supplies the light incidence/light block information for each optical path over the communication line or the signal line L to the controller 20 for temporary storage in a register (not shown) of the muting area determination circuit 47. The muting area determination circuit 47 determines whether or not the light incidence/light block information from the light receiving unit 14 matches the information from the teaching input circuit 43, and then determines the muting area.

(Step 4) The user checks on the display section 21 of the controller 20 to see if the muting area is set by performing the teaching operation as intended.

(Step 5) If the user checks and determines that the muting area is set as intended, then the user switches the switch of the teaching input circuit 43 of the controller 20 to switch the mode from the teaching mode to the normal operation mode (RUN mode), and the controller 20 stores the setup first muting area in the nonvolatile memory 44.

(Step 6) The user then executes steps 2 to 5 again to set a second muting area and to store the setup second muting area in the nonvolatile memory 44 of the controller 20.

(Step 7) The user then executes steps 2 to 5 again to set and store a third muting area as required. This step can be repeated for setting additional muting areas.

Next, the operation of the multi-optical-path photoelectric safety apparatus 10 after one or more muting areas are set will be discussed in connection with the case where two muting areas are set. This procedure is preferably applied to a predetermined light block substance or workpiece having portions with different heights such as the workpiece W shown in FIG. 1. It can also be applied to two or more types of predetermined light block substances or workpieces having different heights.

Referring to FIG. 9, a muting area switching signal is input from the sequencer 55 to the area switch input circuit 46 of the controller 20. The controller 20 determines whether or not the input signal is correct. For example, if two input lines are connected for safety, namely, a dual-redundant input signal is adopted, the controller 20 determines whether or not the input signal is correct based on whether the logic of one signal matches that of the other signal.

If it is determined that the input signal is correct, the muting area is switched in accordance with the input signal. For example, the information concerning the first muting area stored in the nonvolatile memory 44 of the controller 20 is transferred to the muting area register 34 of the light receiving unit 14.

When the information is transferred to the light receiving unit 14 it is important to avoid the risk of malfunction in the register and to avoid the risk of malfunction caused by noise when the muting area information is transferred from the controller 20 to the light receiving unit 14. In this regard, a dual-redundant muting area register is preferably adopted and when the data is transferred, verification is also conducted.

Only when a predetermined light block substance or workpiece W transported on the belt conveyor 12 is detected by the workpiece detection sensor 51, 52 and a detection signal is input to the controller 20 according to a predetermined sequence, will the controller 20 determine that the workpiece W has entered the detection area of the light curtain. The controller 20 then starts the muting operation, sends a muting start command to the light receiving unit 14, and turns on an indicator lamp (not shown) to show that the muting operation is now being performed.

Upon receiving a muting start command from the controller 20, the light receiving unit 14 uses the information in the light receiving data register 33 which is storing the light incidence/light block information for each optical path and the information in the muting area register 34 to determine whether any optical path other than the muting area is in a light incidence state or light block state. The light receiving muting then outputs the determination result to the controller 20.

The controller 20 turns the output from the output circuit 42 on and off according to the light incidence/light block information in any area other than the first muting area.

When a muting area switching signal from the sequencer 55 is input to the controller 20, the controller 20 determines whether or not the signal input to the controller 20 is correct according to the above-described procedure. The controller 20 then transfers the information regarding the second muting area stored in the nonvolatile memory 44 to the muting area register 34 of the light receiving unit 14. While the data is being transferred and is being verified, namely, the muting area register 34 of the light receiving unit 14 is being updated, all of the optical paths enter a muting operation state.

When the information in the muting area register 34 of the light receiving unit 14 is changed to that related to the second muting area, the light receiving unit 14 determines whether any optical path other than the second muting area is in a light incidence state or light blocked state. The light receiving unit 14 then the outputs this determination to the controller 20.

This operation is repeated for the predetermined light block substance or workpiece W having portions with different heights as shown in FIG. 1. When the workpiece W passes through the light curtain, the muting function only becomes effective in the muting area based on the height of the workpiece W. This is the area limited to the optical paths blocked by the workpiece W passing through the light curtain. The essential protection function of the multi-optical-path photoelectric safety apparatus 10 is maintained in all other areas. Thus, for example, when an object, such as a human body, enters the light curtain together with the workpiece W, the operation of the pressing machine 11 is forcibly stopped due to the entry of the human body through the light curtain.

For a workpiece or a predetermined light block substance comprising a varied cross section such as cross-sectional area A, cross-sectional area A+B, and the cross-sectional area A in the workpiece transport direction like the workpiece W in FIGS. 1 and 12A–12C, it is possible for a muting area to be set automatically based on its height dimension. When the muting area is switched, all of the optical paths temporarily enter the muting state while the muting area information is being transferred. Then a transition is made to the muting operation for the new muting area. Accordingly, when the muting area is switched, the muting area that is set in the light curtain can be prevented from entering an undefined state.

If a predetermined light block substance or workpiece is used whose shape continuously changes, the number of setup muting areas can be increased almost continuously. This allows the muting area to be changed in response to the shape of the workpiece.

Figure 13:
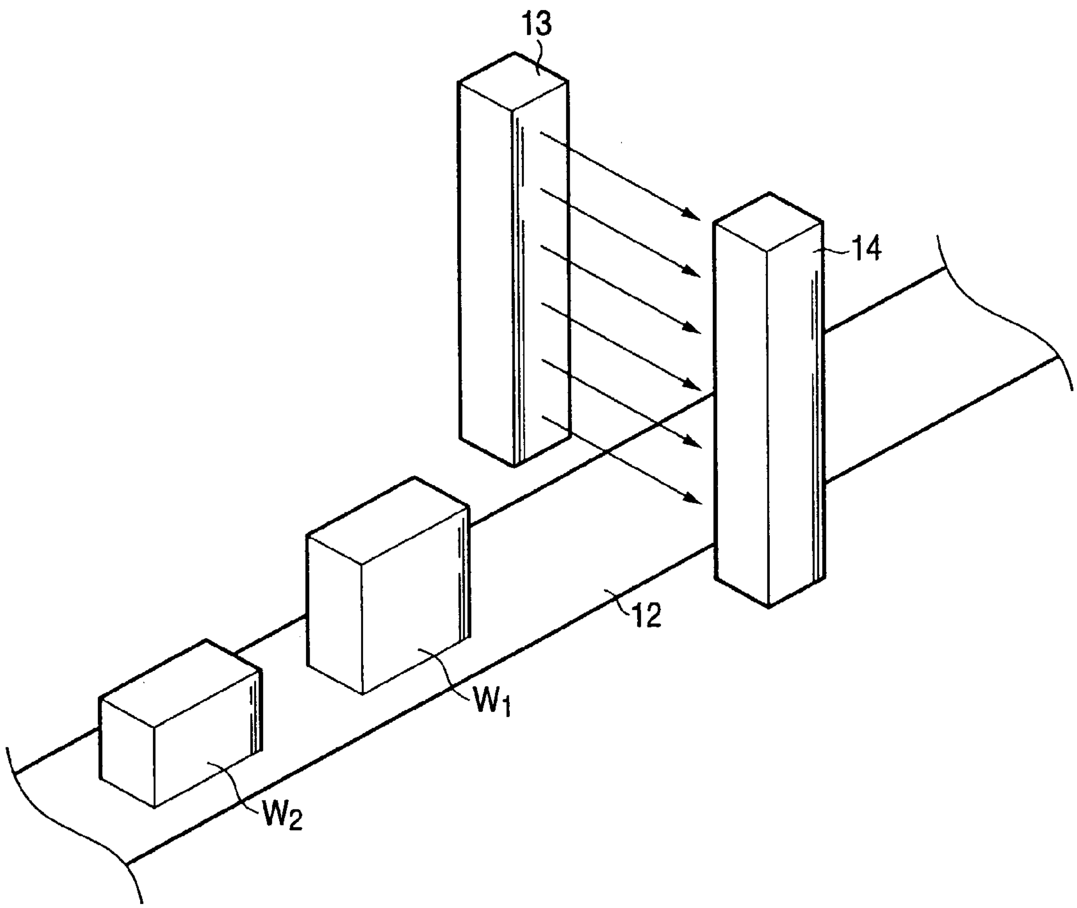
FIG. 13 is a drawing describing the switching to a muting area responsive to the size of a workpiece when different types of workpieces are transported on the conveyor line.
Figure 14:
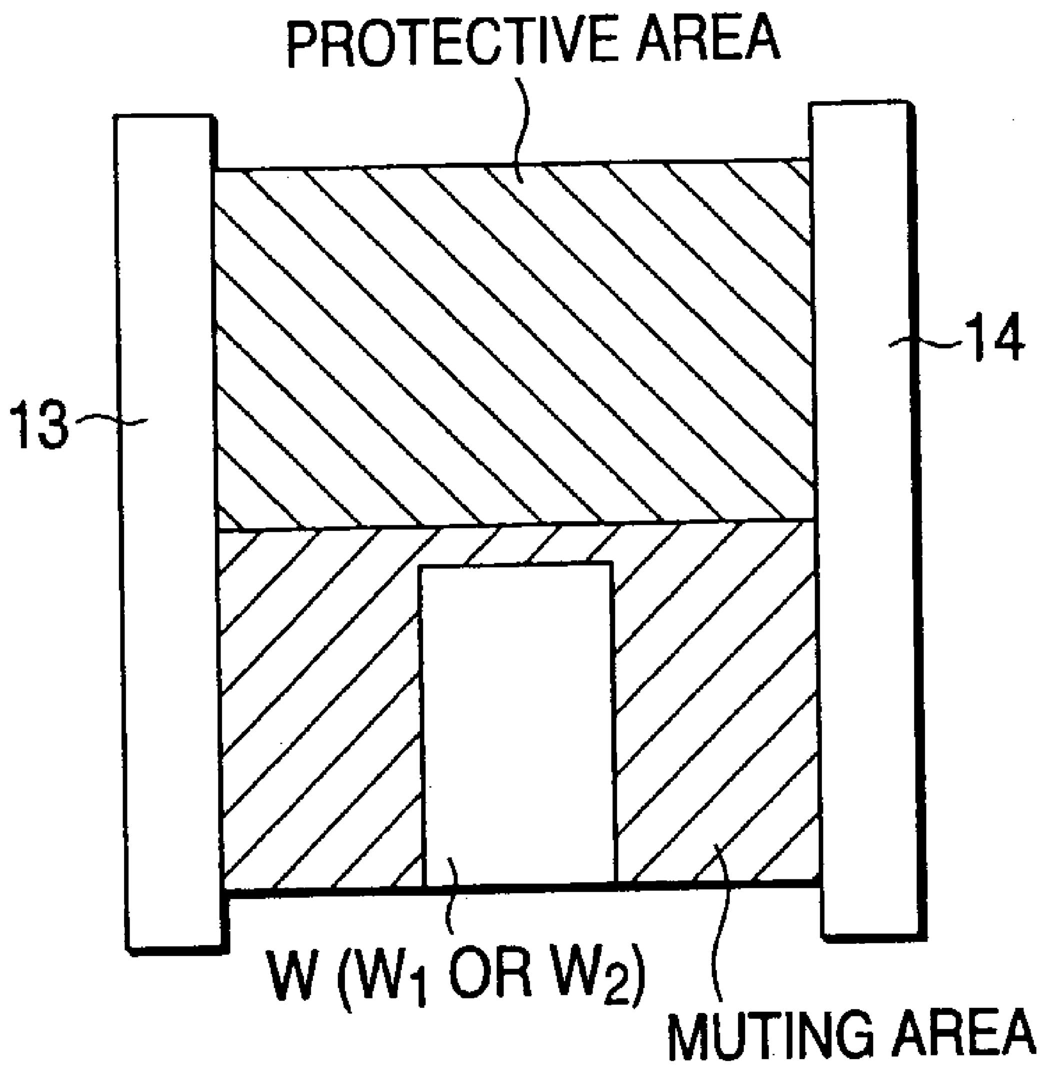
FIG. 14 is a drawing describing a muting area of a size corresponding to the size of a workpiece.
Figure 15:
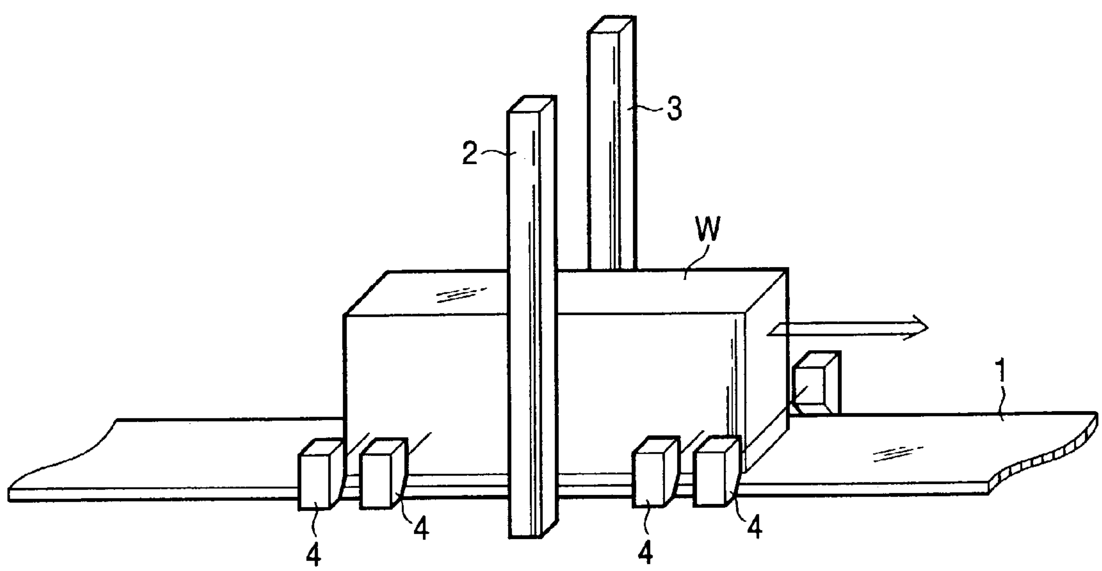
FIG. 15 is a drawing describing a muting function of a multi-optical-path photoelectric safety apparatus in a related art device.

As shown in FIGS. 13 and 14, two or more predetermined light block substances or workpieces W1 and W2 having different height dimensions are transported on the conveyor line 12. When the first workpiece W1 passes through the space between the light emitting unit 13 and the light receiving unit 14, the muting function becomes effective in the first muting area based on the height of the first workpiece W1. When the second workpiece W2 passes through the space between the light emitting unit 13 and the light receiving unit 14, the muting function becomes effective in the second muting area based on the height of the second workpiece W2. Although the muting area may be switched based on a command from the sequencer 55, it is possible to use a sensor to detect the height of a workpiece. Then a muting area corresponding to the height of the workpiece may be selected based on the information detected by the sensor and the muting function becomes effective in the newly selected muting area.

If an invalid muting area switching signal from the sequencer 55 is input to the controller 20, and the logic of one of dual signals does not match that of the other signal, it is assumed that the reliability of the whole system is degraded. Then the output from the controller 20 is preferably turned off, the operation of the pressing machine 11 is forcibly stopped, and an error message is displayed.

Since the muting area register 34 and the determination circuit 35 are placed in the light receiving unit 14, the muting area cannot be defined while muting area change data is being transferred from the controller 20 to the light receiving unit 14 or while data is being verified. As a result, all of the optical paths are temporarily placed in the muting state. However, the light receiving unit 14 is provided with a plurality of muting area registers 43, whereby it is possible to change the muting area without temporarily placing all of the optical paths in the muting state.

In the embodiment shown, the determination circuit 35 is located in the light receiving unit 14. This circuit can also be used to provide another function of the light curtain and also may be placed in the controller 20 rather than in the light receiving unit 14. Likewise, the muting area register 34 may also be placed in the controller 20 rather than in the light receiving unit 14.

As a further modification, the detection area of the light curtain may be divided into several blocks and a plurality of muting areas defined in each block may be provided. The user may also set any desired muting area or an area in which the muting function is suppressed by an external input. The user may also set a part of the detection area of the light curtain as a muting area. This is done by entering the optical path number for the muting area to be set by an external input means such as a numeric keypad, etc.

A personal computer may also be connected to the controller 20 using a USB, RS232C, RS485, on other connection. This allows the user to specify a part of the detection area of the light curtain as the muting area from the personal computer, thereby setting the muting area.

The preferred embodiments of the present invention have been described primarily using the case where the light emitting element 13 and the light receiving unit 14 are installed across the conveyor line 12. However, the invention is not limited to this arrangement. For example, this invention can also be applied where a light curtain is installed so that it surrounds a dangerous source in an apparatus.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2002-017572 filed Jan. 25, 2002 is hereby incorporated by reference.

What is claimed is:

1. A multi-optical-path photoelectric safety apparatus comprising:

a light emitting unit;

a light receiving unit forming a light curtain with the light receiving unit; and a muting function for temporarily rendering a protection function of the light curtain ineffective by allowing a predetermined light block substance to pass through the light curtain, wherein the muting function includes defining a muting area where the muting function is performed and the muting area is set to a region of a detection area forming the light curtain and a protection function is performed on a remaining portion of the detection area forming the light curtain, wherein the light emitting unit has a plurality of light emitting elements that are equally spaced from each other and placed in a row, and the light receiving unit is arranged so as to face the light emitting unit, the light receiving unit has a corresponding number of light receiving elements as the number of the light emitting elements, the light receiving elements are equally spaced from each other and are placed in a row, and wherein each of the light receiving elements and a corresponding light emitting element form an optical path for forming the light curtain; and a display section for displaying whether the muting area is set for each of the optical paths.

2. The multi-optical-path photoelectric safety apparatus according to claim 1, wherein a plurality of different muting areas are provided, and wherein the muting area that exerts the muting function can be switched among the plurality of different muting areas so as to provide a muting area responsive to a size of the predetermined light block substance.

3. The multi-optical-path photoelectric safety apparatus according to claim 2, wherein the detection area of the light curtain is divided into predetermined blocks and the plurality of different muting areas are set for each block, and wherein the muting function selects the muting area from the plurality of different muting areas in each predetermined block.

4. The multi-optical-path photoelectric safety apparatus according to claim 1, wherein the muting area is set by teaching.

5. The multi-optical-path photoelectric safety apparatus according to claim 1, wherein the muting area is set by an external input means.

6. The multi-optical-path photoelectric safety apparatus according to claim 1, further comprising:

a storing section for storing information of a plurality of different muting areas for exerting the muting function; and a muting area switch unit for switching the muting area from among the plurality of different muting areas in the storing section, so as to provide a muting area responsive to a size of a predetermined light block substance.

7. The multi-optical-path photoelectric safety apparatus according to claim 1, wherein said display section has a plurality of display elements, each of the display elements corresponding to an optical path for displaying whether the optical element is set for each of the optical paths.

8. A multi-optical-path photoelectric safety apparatus comprising:

a light emitting unit having a plurality of light emitting elements equally spaced from each other and being disposed in a row;

a light receiving unit separated from the light emitting unit and having a corresponding number of light receiving elements as the number of the light emitting elements, the light receiving elements being equally spaced from each other and being disposed in a row, and wherein each of the light receiving elements and a corresponding light emitting element form an optical path for forming a light curtain;

a control unit for controlling each of the optical paths to detect entry of a light block substance; and a muting optical path setting unit for setting a muting function for each of the optical paths for temporarily rendering the protection function of the light curtain ineffective by allowing a predetermined light block substance to pass through the light curtain, wherein the muting optical path setting unit exerts the muting function to define a muting area where the muting function is performed and the muting area is set to a region of a detection area forming the light curtain and a protection function is performed on a remaining portion of the detection area forming the light curtain; and a display section for displaying whether the muting area is set for each of the optical paths.

9. The multi-optical-path photoelectric safety apparatus according to claim 8, further comprising:

a storing section for storing information of a plurality of different muting areas for exerting the muting function, the different muting areas being set by the muting optical path setting unit; and a muting area switch unit for switching the muting area from among the plurality of different muting areas in the storing section, so as to provide a muting area responsive to a size of a predetermined light block substance.

10. The multi-optical-path photoelectric safety apparatus according to claim 8, wherein said display section has a plurality of display elements, each of the display elements corresponding to an optical path for displaying whether the optical element is set for each of the optical paths.

11. A multi-optical-path photoelectric safety apparatus comprising:

a light emitting unit having a plurality of light emitting elements equally spaced from each other and being disposed in a row;

a light receiving unit separated from the light emitting unit and having a corresponding number of light receiving elements as the number of the light emitting elements, the light receiving elements being equally spaced from each other and being disposed in a row, and wherein each of the light receiving elements and a corresponding light emitting element form an optical path for forming a light curtain;

a control unit for controlling each of the optical paths to detect entry of a light block substance;

a muting area setting unit for setting a muting function for a muting area for temporarily rendering the protection function of the light curtain ineffective by allowing a predetermined light block substance to pass through the light curtain, wherein the muting area setting unit exerts the muting function and the muting area is set to a region of a detection area forming the light curtain and a protection function is performed on a remaining portion of the detection area forming the light curtain; and a display section for displaying whether the muting area is set for each of the optical paths.

12. The multi-optical-path photoelectric safety apparatus according to claim 11, further comprising:

a storing section for storing information of a plurality of different muting areas where the muting function can be performed, the different muting areas being set by the muting area setting unit; and a muting area switch unit for selecting and switching the muting area from among the plurality of different muting area in the storing section, so that a selected muting area is responsive to a size of the predetermined light block substance.

13. The multi-optical-path photoelectric safety apparatus according to claim 11, wherein said display section has a plurality of display elements, each of the display elements corresponding to an optical path for displaying whether the optical element is set for each of the optical paths.

* * * * *